(12) United States Patent
Tsougarakis et al.

(10) Patent No.: US 6,901,110 B1
(45) Date of Patent: May 31, 2005

(54) SYSTEMS AND METHODS FOR TRACKING OBJECTS IN VIDEO SEQUENCES

(75) Inventors: Constantinos Tsougarakis, Phoenix, AZ (US); Sethuraman Panchanathan, Gilbert, AZ (US)

(73) Assignee: Obvious Technology, San Francisco, CA (US)

( * ) Notice: Subject to any disclaimer, the term of this patent is extended or adjusted under 35 U.S.C. 154(b) by 0 days.

(21) Appl. No.: 09/522,882

(22) Filed: Mar. 10, 2000

(51) Int. Cl.$^7$ ................................................. H04N 7/12
(52) U.S. Cl. ............. 375/240.12; 375/240; 375/240.01; 375/240.08; 375/240.16
(58) Field of Search ............................ 375/240.12, 240, 375/240.01, 240.08, 240.16, 241.16; 348/607, 208.13, 169; 382/243, 283, 132

(56) References Cited

U.S. PATENT DOCUMENTS

| | | | |
|---|---|---|---|
| 5,072,384 A | * 12/1991 | Doi et al. ................... | 382/132 |
| 5,237,648 A |   8/1993 | Mills et al. ................. | 345/723 |
| 5,598,226 A | *  1/1997 | Kokaram .................... | 348/607 |
| 5,729,471 A |   3/1998 | Jain et al. ................... | 725/134 |
| 5,745,710 A |   4/1998 | Clanton, III et al. ........ | 725/60 |
| 5,748,789 A | *  5/1998 | Lee et al. .................... | 382/243 |
| 5,956,716 A |   9/1999 | Kenner et al. ............... | 707/10 |
| 5,963,203 A |  10/1999 | Goldberg et al. ........... | 345/723 |
| 5,973,733 A | * 10/1999 | Gove .................... | 348/208.13 |
| 6,404,936 B1 | *  6/2002 | Katayama et al. ......... | 382/283 |

FOREIGN PATENT DOCUMENTS

| | | |
|---|---|---|
| EP | 0 555 028 | 8/1993 |
| EP | 0 590 759 | 4/1994 |
| FR | 97.00423 | 1/1997 |

OTHER PUBLICATIONS

"Advanced Imaging Product Survey: Photo, Document and Video," *Advanced Imaging,* Oct. 1994, pp. 66–72.

Akutsu et al., "Video Indexing Using Motion Vectors," *Proceedings of the SPIE,* vol. 1818, No. Part 3, Nov. 18, 1992, pp. 1522–1530.

Ardizzone et al., "A Real–Time Neural Approach to Scene Cut Detection," *IS&T/SPLE–Storage & Retrieval for Image and Video Databases IV,* San Jose, California, Jan. 28–Feb. 2, 1996.

(Continued)

*Primary Examiner*—Chris Kelley
*Assistant Examiner*—Allen Wong
(74) *Attorney, Agent, or Firm*—Kilpatrick Stockton LLP

(57) ABSTRACT

A method for tracking one or multiple objects from an input video sequence allows a user to select one or more regions that contain the object(s) of interest in the first and the last frame of their choice. An initialization component selects the current and the search frame and divides the selected region into equal sized macroblocks. An edge detection component computes the gradient of the current frame for each macroblock and a threshold component decides then which of the macroblocks contain sufficient information for tracking the desired object. A motion estimation component computes for each macroblock in the current frame its position in the search frame. The motion estimation component utilizes a search component that executes a novel search algorithm to find the best match. The mean absolute difference between two macroblocks is used as the matching criterion. The motion estimation component returns the estimated displacement vector for each block. An output component collects the motion vectors of all the predicted blocks and calculates the new position of the object in the next frame.

9 Claims, 16 Drawing Sheets

OTHER PUBLICATIONS

Ariki and Saito, "Extraction of TV News Articles Based on Scene Cut Detection using DCT Clustering," *International Conference on Image Processing,* Sep. 1996, Lausanne, Switzerland, pp. 847–850.

Ding et al., "Previewing Video Data: Browsing Key Frames Rates Using a Video Slide Show Interface," *Proceedings of the International Symposium on Research, Development and Practice in Digital Libraries (ISDL '97),* 1997, pp. 1–13.

Gelgon and Bouthemy, "A region–level graph labeling approach to motion–based segmentation," INRIA Rennes, pp. 1–19.

Golland and Bruckstein, "Note: Motion from Color," *Computer Vision and Image Understanding,* vol. 68, No. 3, Dec. 1997, pp. 347–362.

Gu and Lee, "Semi–Automatic Semantic Video Object Segmentation and Tracking," Microsoft Corporation, pp. 1–33.

Hampapur et al., "Digital Video Segmentation," *ACM Multimedia '94 Proceedings,* ACM Press–1, Oct. 1994, pp. 357–364.

Hoetter, M., "Differential Estimation of the Global Motion Parameters Zoom and Pan," *Signal Processing,* vol. 16, 1989, pp. 249–265.

Huang, J. et al., "Image Indexing Using Color Correlograms," *IEEE Computer Vision and Pattern Recognition Conference,* San Juan, Puerto Rico, Jun. 17–19, 1997, pp. 762–768.

Huang, T.S., "Modeling Analysis and Visualization of Nonrigid Object Motion," *Internat Conf. on Pattern Recognition,* vol. 1, Atlantic City, NJ, Jun. 1990, pp. 361–364.

Kasturi et al., "An Evaluation of Color Histogram Based on Methods in Video Indexing," Dept. of Computer Science and Engineering, The Pennsylvania State University, *Technical Report CSE–96–053,* 1996.

Kataoka et al., "Architecture and Storage Structure of an Interactive Multimedia Information System," *IEICE Transactions on Information and Systems,* vol. E78–D, No. 11, Nov. 1, 1995, pp. 1354–1365.

Kim et al., "A Fast Motion Estimator for Real–Time System," *IEEE Transactions on Consumer Electronics,* vol. 43, No. 1, Feb. 1997, pp. 24–29.

Kobla et al., "Archiving, Indexing, and Retrieval of Video in the Compressed Domain," *SPIE Conference on Multimedia Storage and Archiving Systems,* Boston Massachusetts, Nov. 18–19, 1996, vol. 2916, pp. 78–89.

Luo et al., "A New Prediction Search Algorithm for Block Motion Estimation in Video Coding." *IEEE Transactions on Consumer Electronics,* vol. 43, No. 1, Feb. 1997, pp. 56–61.

Madrane et al., "Video Representation Tools Using a Unified Object and Perspective Base Approach," *Proceedings of the SPIE,* vol. 2420, Feb. 9, 1995, pp. 152–163.

Massey and Bender., "Salient Stills: Process and Practice," *IBM Systems Journal,* vol. 35, No. 3/4, 1996, pp. 557–573.

Meng, J. and Chang, S., "CVEPS– A Compressed Video Editing and Parsing System," *Proceedings of ACM Multimedia 1996,* Boston, Massachusetts, Nov. 18–22, 1996, pp. 43–53.

Mills et al., "A Magnifier Tool for Video Data," *ACM CHI '92,* May 7, 1992, pp. 93–98.

Pass et al., "Comparing Images Using Color Coherence Vectors," *Proceedings of ACM Multimedia 1996,* Boston, Massachusetts, Nov. 18–22, 1996, pp. 65–73.

Shio and Sklansky, "Segmentation of People in Motion," Proc. IEEE, vol. 79, pp. 325–332, 1991.

Smith and Kanade, "Video Skimming for Quick Browsing Based on Audio and Image Characterization," Carnegie Mellon University, School of Computer Science, Technical Report CMU–95–186, 1995.

Taniguchi et al., "Panorama Excerpts: Extracting and Packing Panoramas for Video Browsing," *Proceedings of the ACM Multimedia,* Seattle, Washington, Nov. 9–13, 1997, pp. 427–436.

Teodosio and Bender, "Salient Video Stills: Content and Context Preserved," *Proc. ACM Multimedia 93,* California, Aug. 1–6, 1993, pp. 39–46.

Tonomura et al., "Content Oriented Visual Interface Using Video Icons for Visual Database Systems," *Journal of Visual Languages and Computing,* vol. 1, Jan. 1, 1990, pp. 183–198.

Tse and Baker, "Global Zoom/Pan Estimation and Compensation for Video Compression," *Proc. ICASSP,* vol. 4, May 1991, pp. 2725–2728.

Ueda, Hirotada et al., "Automatic Structure Visualization for Video Editing," *Bridges Between Worlds,* Amsterdam, Apr. 24–29, 1993, pp. 137–141.

Wang, Demin, "Unsupervised Video Segmentation Based on Watersheds and Temporal Tracking," Communications Research Center, (Manuscript submitted to: *IEEE Trans. on Circuits & Systems for Video Technology,* Special issue on image and video processing for emerging interactive multimedia services, Oct. 10, 1997), pp. 1–20.

Yeo and Yeung, "Retrieving and Visualizing Video," *Communications of the ACM,* 40(12), Dec. 1997, pp. 43–52.

Yeung et al., "Video Browsing Using Clustering and Scene Transitions on Compressed Sequences," *Proceedings, IS&T/ SPIE Multimedia Computing and Networking,* pp. 399–413 (1995).

Zhang and Smoliar, "Developing Power Tools for Video Indexing and Retrieval," *SPIE,* vol. 2185, pp. 140–149.

Zhang et al., "Automatic Partitioning of Full–Motion Video," *Multimedia Systems* (Springer–Verlag, 1993) 1, pp. 10–28.

Zhang, H.J. et al., "Video Parsing, Retrieval and Browsing: An Integrated and Content–Based Solution," *The Third ACM International Multimedia Conference and Exhibition Multimedia '95,* New York, New York, 1996, pp. 1–19.

* cited by examiner

| -1 | 0 | 1 |
|----|---|---|
| -1 | 0 | 1 |
| -1 | 0 | 1 |

X-DIRECTIONAL GRADIENT

| -1 | -1 | -1 |
|----|----|----|
| 0  | 0  | 0  |
| 1  | 1  | 1  |

Y-DIRECTIONAL GRADIENT

SYSTEMS AND METHODS FOR TRACKING OBJECTS IN VIDEO SEQUENCES

FIELD OF THE INVENTION

This invention is generally directed to systems and methods for use in computer image or video processing and, more particularly, to systems and methods for object tracking in video sequences.

BACKGROUND

In general, image processing generally refers to the taking either real world images captured by devices such as cameras, infrared sensors and ultrasound scanners or computer-generated images created by computer graphics, modeling or animation software packages and manipulating those images in order to achieve a desired result. On the other hand, video processing generally involves taking video sequences captured by an analog or a digital camera, which can be viewed as a collection of still images or frames that contain independently moving objects, and extracting useful information about an object of interest. Such information can be used for storage and retrieval of video sequences in a multimedia environment or as an input to compression algorithms, depending on the specific needs of the application.

Advances in modern multimedia technologies over the last few years have led to a dramatic growth of digitally stored data, such as archives of images, audio and video, and the exchange of such data over communication networks. Numerous applications in diverse fields such as medicine, remote sensing, education, video-on-demand, video conferencing, high definition television (HDTV), on-line information services and entertainment, require the manipulation, storage and retrieval of visual data.

An important task in multimedia applications, such as multimedia databases, is indexing and accessing images and, significantly, being able to perform this indexing and accessing of images or videos quickly. For example, news broadcasting television stations frequently store footage of news stories in video databases. To properly index the videos, the television station must have knowledge of all the subjects contained in the videos, the frames in which they are present, as well as the location of the objects of interest within each frame. To manually search and index each video footage and divide it according to the subject is a very tedious and time-consuming task since each video sequence is composed by thousands of individual frames. Video processing algorithms have accordingly been developed which can dramatically reduce the amount of time required for such a task. With these algorithms, the user selects the location of an object of interest in the first frame and the algorithm tracks the object in all of the subsequent frames. With the information of the location of the subject in each frame available and with the frames in which the object appears identified, the indexing and later retrieval of each video sequence can be more easily achieved.

Another use of video processing is in compression algorithms. Video sequences form large data files that require a large amount of transmission bandwidth as well as storage requirements. As a result, the development of efficient compression algorithms is a crucial task in video processing and has been an active field of research over the last ten years. Several standards have emerged for video compression, such as H.263 and the MPEG compression family. There are two types of redundancy in video sequences, spatial and temporal. Compression can be achieved by exploiting those redundancies. Temporal redundancies are usually removed by using motion estimation and compensation algorithms. Motion estimation techniques take the location of an object of interest in the current frame as an input and calculate the new position of the object in the next frame. The motion is described in terms of a motion vector, which is the signed difference between the current and the next position. Motion compensation attempts to predict subsequent frames at the decoder level on the basis of already decoded frames and the estimation of the object's motion received from the coder. In the context of the currently emerging MPEG-4 compression standard, there is a great deal of interest in content-based manipulations and object-based video coding. After objects in a scene have been identified by their contour, the current frame is divided into regions and the motion of each region is calculated with respect to the previous frame or the next frame in the video sequence.

While the human visual system can easily distinguish between moving objects, computer-based object tracking remains a challenge. Several approaches to motion estimation have been developed over the last few years, such as optical field methods, baysian methods and block-based methods. Block-based motion estimation and compensation in particular are among the most popular approaches due primarily to their more simple hardware. As a result, block-based motion estimation has been adopted by the international standards for digital video compression, such as with H.261, H.263 and the MPEG family.

The block motion model assumes that the image is composed of moving blocks. In block matching, the best motion vector estimate is found by a pixel-domain search procedure. According to this procedure, the displacement of a pixel at $(n_1, n_2)$ in a current frame k is determined first by considering an $N_1 \times N_2$ block centered around $(n_1, n_2)$. Next, a search is performed at a search frame at k+1 for the location of the best matching block of the same size. The search is usually limited for computational reasons to a region $(N_1+2M_1) \times (N_2+2M_2)$ called the search window, where $M_1$ and $M_2$ are predefined integers that determine the window size. Block-matching algorithms differ in the matching criteria, the search strategy, and the determination of block size.

The matching of the blocks can be quantified according to several criteria such as maximum cross-correlation, minimum square error, mean absolute difference and maximum matching pel count. Finding the best-matching block requires the optimization of the chosen matching criterion over all possible candidate displacement vectors at each pixel $(n_1, n_2)$. One way of achieving this is by a full-search method, which evaluates the matching criterion for every location within the search window. Although the full-search is guaranteed to find the best-matching block, it requires a great amount of processing, is extremely time-consuming, and is therefore highly impractical for real-time response systems. In most cases, faster search strategies are utilized, even though they often lead to sub-optimal solutions. One of these faster search methods is a three-step search, a popular algorithm of the logarithmic search family. With the three-step search, instead of searching the entire window for the best match, it only calculates the similarity measure at nine evenly distributed positions. The best matching position from one step becomes the starting point for the next one step. One limitation of the three-search step is that it may not find the global minimum, which is the best-matching block in the entire search window, but may instead get trapped in a local minimum.

The selection of an appropriate block size is essential for any block-based motion estimation algorithm and is influenced by a number of factors, some of which impose conflicting requirements on the size of the search blocks. If the blocks are too small, a false match may be established between blocks containing similar gray-level patterns, which are unrelated in terms of motion. On the other hand, if the blocks are too big, then actual motion vectors may vary within the block, violating the basic assumption of a single motion vector per block.

To address the problem of selecting the optimal block size, a hierarchical block-matching algorithm has been developed that uses a multi-resolution representation of frames in the form of a Laplacian pyramid or wavelet transform. The basic idea of hierarchical block-matching is to perform motion estimation at each level of resolution successively, starting at the lowest resolution level which serves as a rough estimate of the displacement vector and then using relatively smaller blocks. The estimate at one level is then passed on to a higher resolution level as an initial estimate. The higher resolution levels serve as a refinement of the initial displacement vector estimate. A drawback of hierarchical block-matching methods is that they require additional computations for calculating the sub-sampled representations of each frame plus additional memory storage. Thus, the better performance of the hierarchical block-matching algorithm can be outweighed by the increase of running time.

SUMMARY OF THE INVENTION

The present invention addresses the problems of the above-discussed block-based search algorithms. In a preferred embodiment, a motion engine incorporates features of a full-search, a three-step search, and a hierarchical algorithm to create a new hybrid search method. Moreover, an output component is used to store the motion vectors of a specific block over a sequence of frames. In order to overcome the problem of false motion prediction with smaller block sizes, an edge detection component, based on the gradient of the frame, determines whether a macroblock contains sufficient information, such as strong edges, for motion tracking purposes. A threshold component next determines which of the macroblocks are tracked and which macroblocks are discarded. The macroblocks that are discarded and thus not searched include those that belong either to the background or macroblocks that contain similar gray-level patterns. The search can then be focused on the macroblocks that contain strong edges, which are typically located at the boundaries of an object. Finally, after predicting the motion vectors for all searched blocks, an output component collects all the motion vectors together and calculates the final position of the object of interest.

By using the basic assumption that an object is more likely to follow a smooth motion trajectory over time, the motion engine preferably first checks whether the block at a frame k has moved by the same displacement vector as it did in the previous frame k−1. Also, the displacement of the current block is checked against the displacement of its neighboring blocks. Adjacent blocks that belong to the same object usually have the same motion, especially in the cases where the object of interest has a rigid body. Frequently, the previous two comparisons can help to avoid the step of the search mechanism and thus they can drastically reduce the computational overhead.

In a preferred embodiment of the invention, a system includes a motion engine for tracking one or multiple objects in a video sequence by using a motion estimation method. The system includes an initialization component, which sets the values of several constants that are used by the rest of the components. These constants include the x and y dimensions of the frames, the number of frames contained in the video sequence, the size of the blocks for the block-matching algorithm, and thresholds used for edge detection and motion estimation purposes. Following the initialization of the above mentioned values, a user component receives from the user input on the two rectangular regions or bounding boxes that surround the object of interest to be tracked. The first bounding box is selected in the first frame or enter point of the video sequence that the user is interested in, whereas the second bounding box is selected in the last frame or exit point. Each rectangular region is defined by a pair of coordinates $(x_1, y_1)-(x_2, Y_2)$. Before continuing with the execution of the rest of the search algorithm, the user component verifies that the coordinates received lie within the dimensions of the given frame. If the coordinates are incorrect, the motion engine terminates operation. Otherwise, the first frame that the user has chosen is selected as the current frame and the next frame in the video sequence is selected as the search frame.

Next, the motion engine enters a loop that is executed for all of the frames that lie within the frames selected by the user. Inside this loop, a motion estimation component is executed. The first step for the motion estimation component is to read the pixel values of the current frame and of the search frame and store them into two two-dimensional arrays. Each element of the arrays holds the RGB color-value of a pixel. This task is preferably performed by a component that is provided external to the motion estimation component.

After the pixel values of the two frames have been stored, the position of each of the vertices of the bounding box is adjusted so that the size of the box is a multiple of the macroblock size. This assures that the rectangular region will be divided into an even number of macroblocks in the x (rows) and y (columns) dimensions. In the following step, an edge detection component is executed. The edge detection component returns a gradient of the current frame. The output of the edge detection component is passed on to a threshold component that decides, based on a predefined threshold set during the initialization process, which of the blocks are good candidates for the motion estimation component. The systems discard all macroblocks that have a gradient value below a certain threshold and pass the remaining macroblocks to the search component.

For each remaining block, the search component first checks whether there is a history of motion vectors stored for that particular block. If there is, the most recent motion vector is applied to the search block and the matching of the two macroblocks is measured using the mean absolute difference criterion. If the difference between the two macroblocks is below a certain error threshold, the search component terminates and returns the motion vector that was used. Otherwise, the macroblocks around the neighborhood of the current macroblock are checked to determine whether motion vectors have been assigned to them in the current frame. If so, the average of those motion vectors is used to determine the position of the block in the search frame and the matching process is then executed again. If the difference between the two blocks is below the error threshold, the search component terminates and returns the new motion vector. Otherwise the complete search algorithm is executed.

The algorithm employed by the search component is a combination of features from three search algorithms, namely a full search, a three-step search and a hierarchical search. The search algorithm combines advantages of these algorithms without the shortcomings of each method. The search component returns a new motion vector for each block. Finally, after determining the motion vectors for all of the selected macroblocks, an output component collects all of the motion vectors predicted and determines the new position of the bounding box that contains the object of interest in the next frame.

All of the above steps are repeated for each pair of frames until the last frame of the video sequence that the user has selected is reached. If for some reason during this process, the motion engine cannot determine the position of the object in the next frame, usually due to object occlusion, the execution is halted in this forward search and the motion engine then proceeds to perform a backward search. This backward search involves resuming from the last frame that the user has selected using the second bounding box. The same process is repeated except that the previous frame in the video sequence is used as the search frame.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings:

FIGS. 8(A) and 8(B) are illustrations of the Prewitt gradient filters, used by the edge detection component of FIG. 7;

DETAILED DESCRIPTION

Reference will now be made in detail to preferred embodiments of the invention, non-limiting examples of which are illustrated in the accompanying drawings. Wherever possible, the same reference will be used throughout the detailed description to refer to the same or like parts.

The present invention relates to methods and systems for tracking one or more objects in a video sequence. The systems and methods for tracking objects in video sequences are useful in many applications. For instance, they are useful when indexing or accessing video and are especially useful when the indexing or accessing need to occur in real-time or in a short period of time. The video sequence may contain synthetic images created through a computer graphics application, or real-life images captured by a camera. The systems and methods may advantageously be used with other systems or methods. For instance, the systems and methods for tracking objects may form part of a larger network for distributing video over the Internet or over other networks. The preferred network is the Obvious™ Media Center. Reference is made to co-pending patent application Ser. No. 09/411,873 filed on Oct. 4, 1999, which is incorporated herein by reference.

Figure 1:
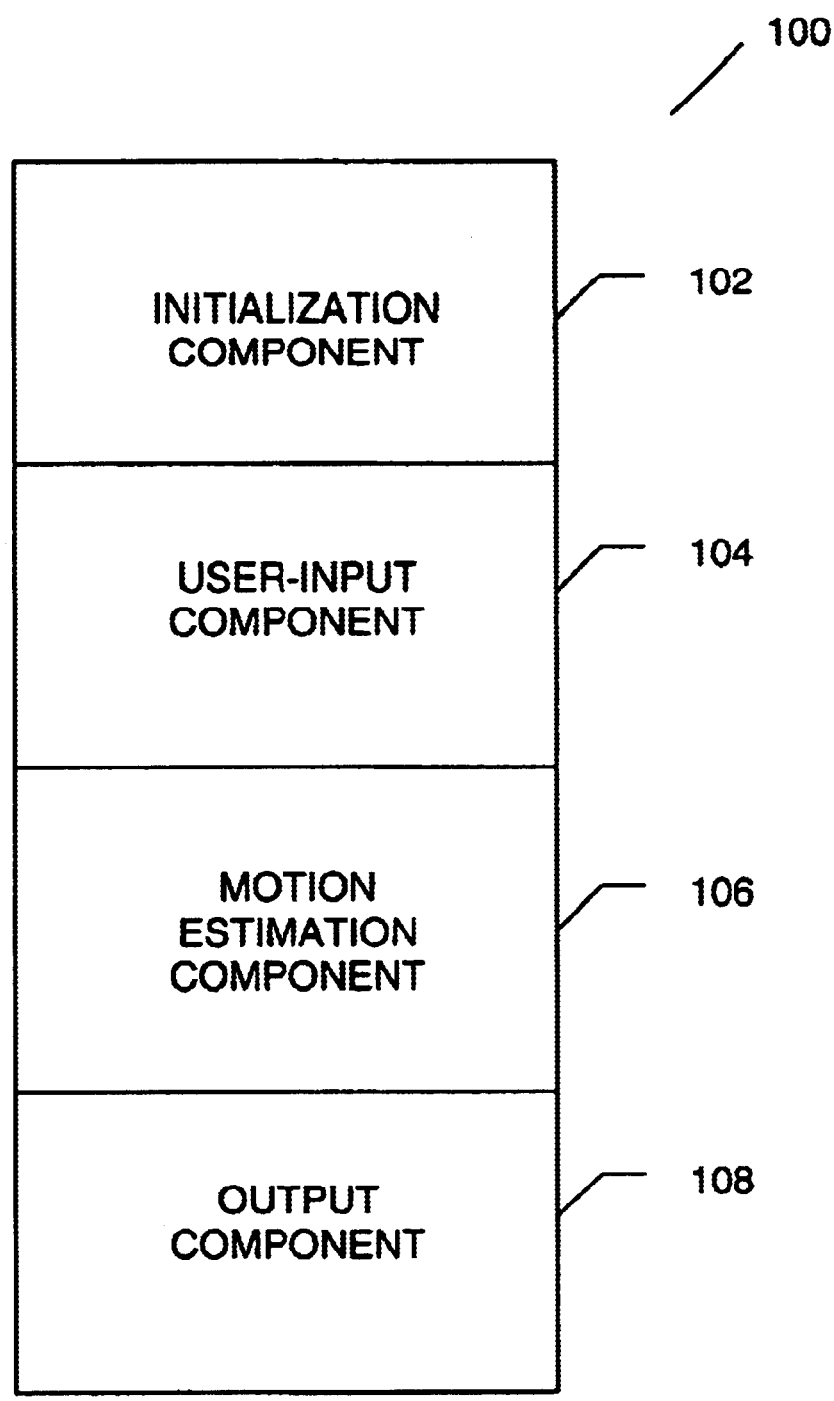
FIG. 1 is a block diagram of a tracking system according to a preferred embodiment of the invention.

A system according to a preferred embodiment of the invention is shown in FIG. 1. The system comprises a motion engine 100 that comprises an initialization component 102, a user-input component 104, a motion estimation component 106, and an output component 108. The motion engine 100 may reside on single computer, such as with a Pentium MMX processor or higher, or it may reside on multiple processors.

In general, the initialization component 102 establishes values for various parameters used by some of the other components, such as the motion estimation component 106. After initialization, the user-input component 104 receives an identification of an object to track and controls the motion tracking from frame to frame. The actual tracking of an object's motion is performed by the motion estimation component 106. As will be described in more detail below, the motion estimation component 106 combines some of the main principles of a full search, three-step search, and hierarchical search to yield a method of searching that quickly and efficiently tracks the motion of an object from frame to frame. The output component 108 takes the results of the motion tracking for one search frame and prepares the engine 100 for searching in the next search frame.

Figure 2:
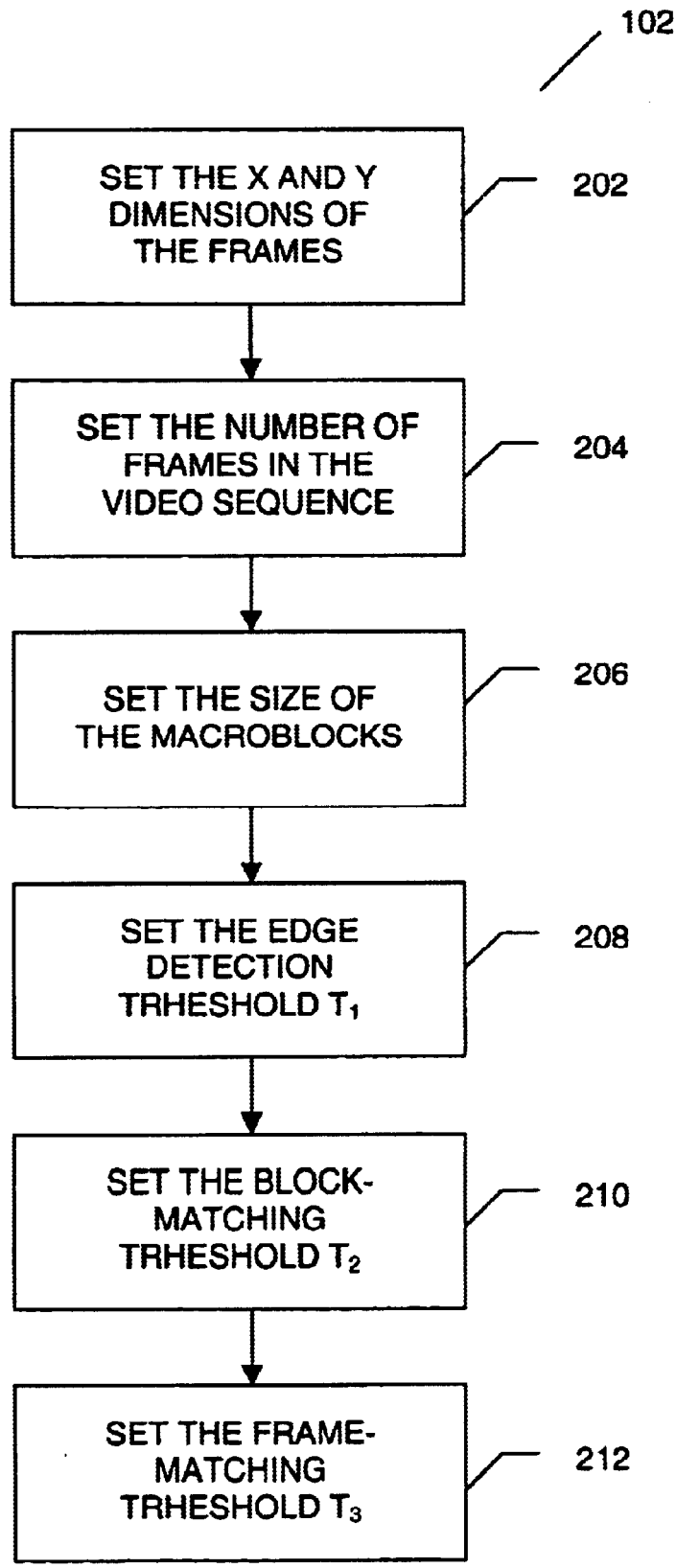
FIG. 2 is a flow chart showing a method of operation for an initialization component forming part of the system in FIG. 1.

A preferred method of operation for the initialization component 102 will now be described with reference to FIG. 2. As discussed above, the initialization component 102 sets the values of constants that are used during execution by the rest of the components. At 202, the initialization component 102 sets values of the x and y dimensions of the frames and at 204 sets the values of the number of frames contained in a video sequence. At 206, the initialization component 102 sets the size of macroblocks used in a block-matching algorithm.

At 208, 210, and 212, the initialization component 102 defines threshold values that are used by several other components. At 208, the initialization component sets the value for a threshold $T_1$, which is used by the binary component to determine which of the macroblocks received by the edge detection component contain significant information for tracking purposes. The initialization component 102 also sets a threshold $T_2$ used to determine the maximum prediction error allowed for two blocks in order to be declared as matched. If the value of matching criterion used in a search process exceeds the value of $T_2$, the current macroblock is declared as mismatched. At 212, the initialization component 102 sets a threshold $T_3$ of the maximum number of mismatched macroblocks allowed between the current frame and a search frame. If the number of mismatched macroblocks is greater than the threshold $T_3$, then the current frame is declared as mismatched and the execution of the search algorithm halts. The values of the thresholds $T_1$, $T_2$, and $T_3$, were determined experimentally during several simulation tests and preferred values are 0.5, 32.0, and 35%, respectively.

Figure 3A:
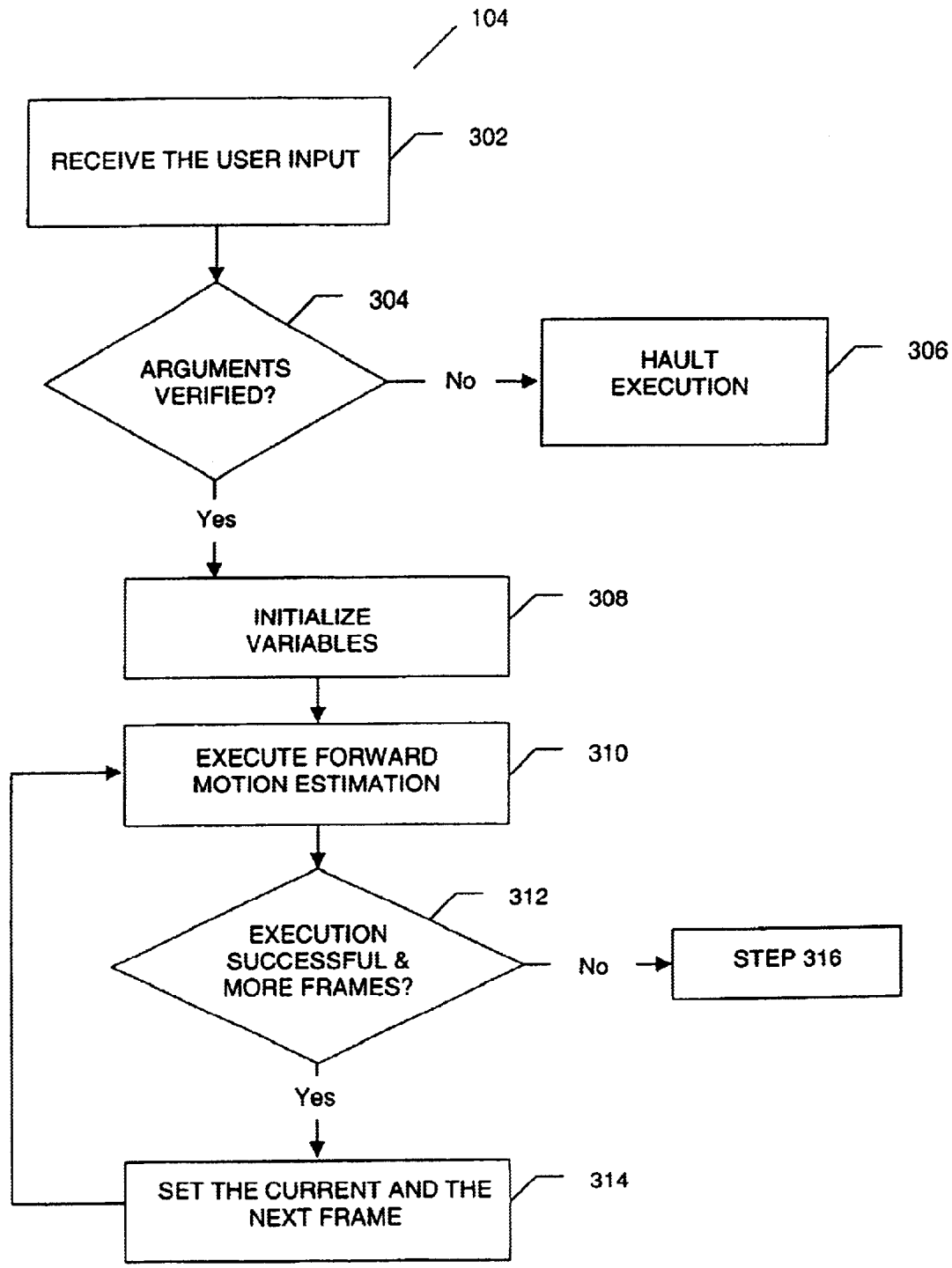
FIGS. 3(A) and 3(B) are flow charts illustrating a method of operation for a user-input component forming part of the system in FIG. 1.
Figure 3B:
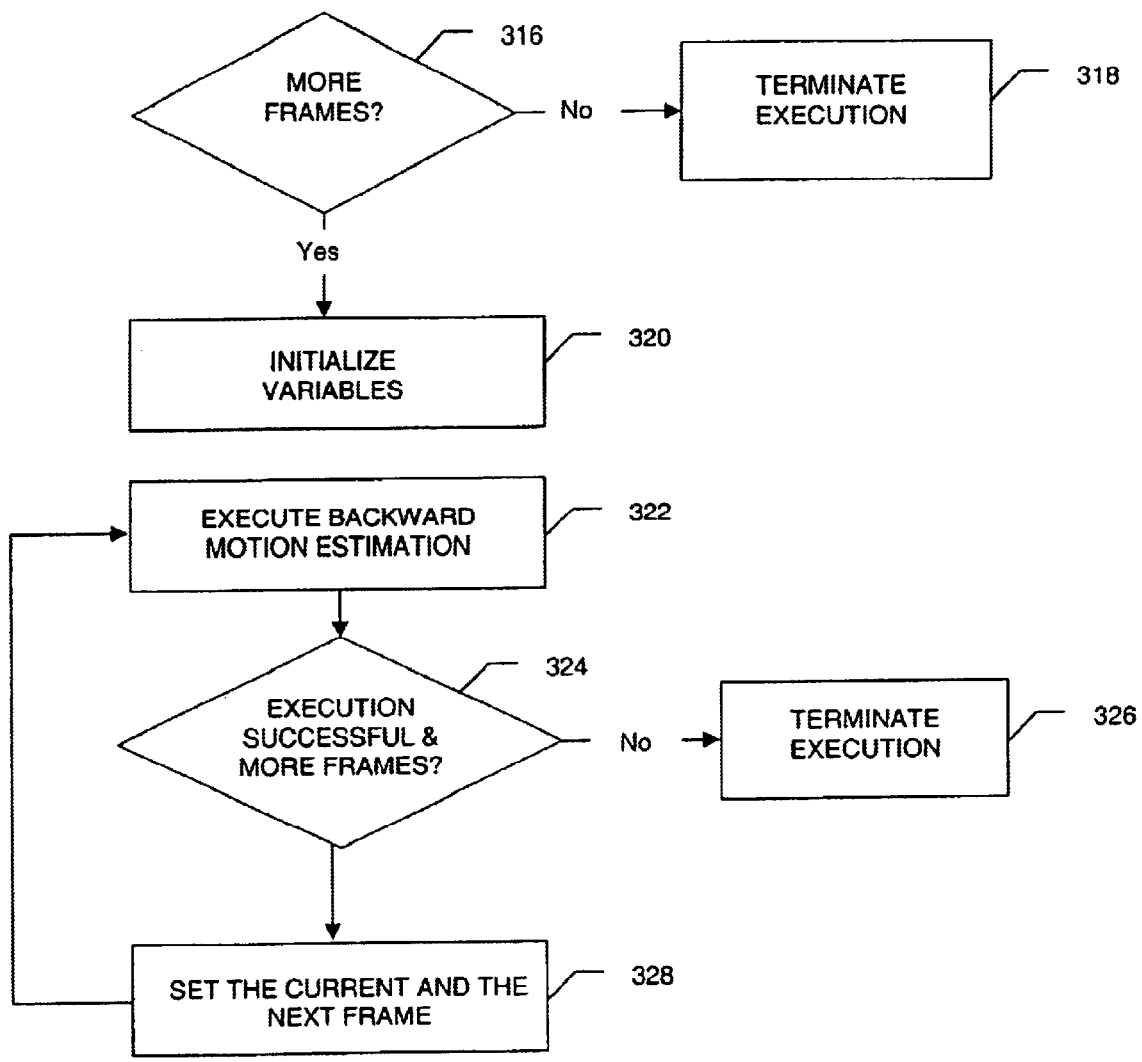
Figure 12A:
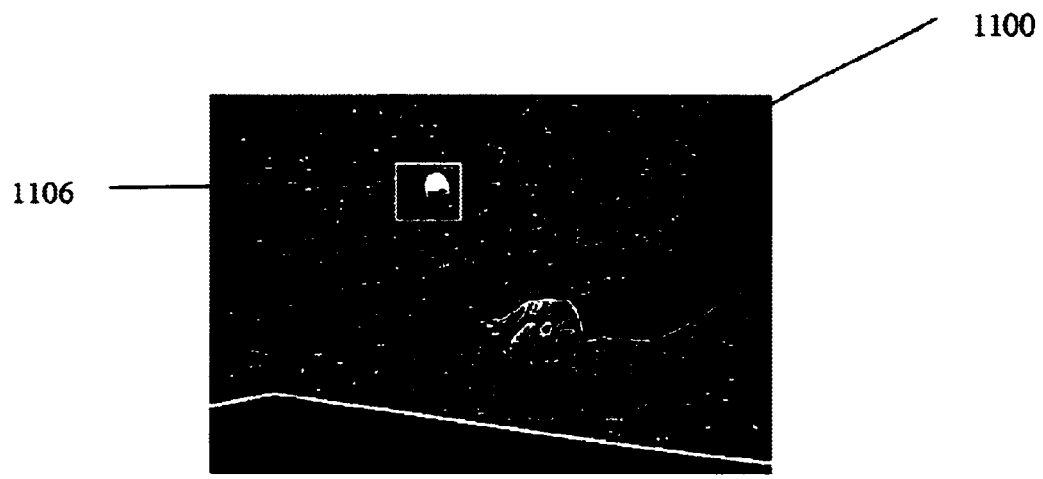
FIGS. 12(A) and 12(B) are illustration of two frames of a video sequence containing an object to be tracked.
Figure 12B:
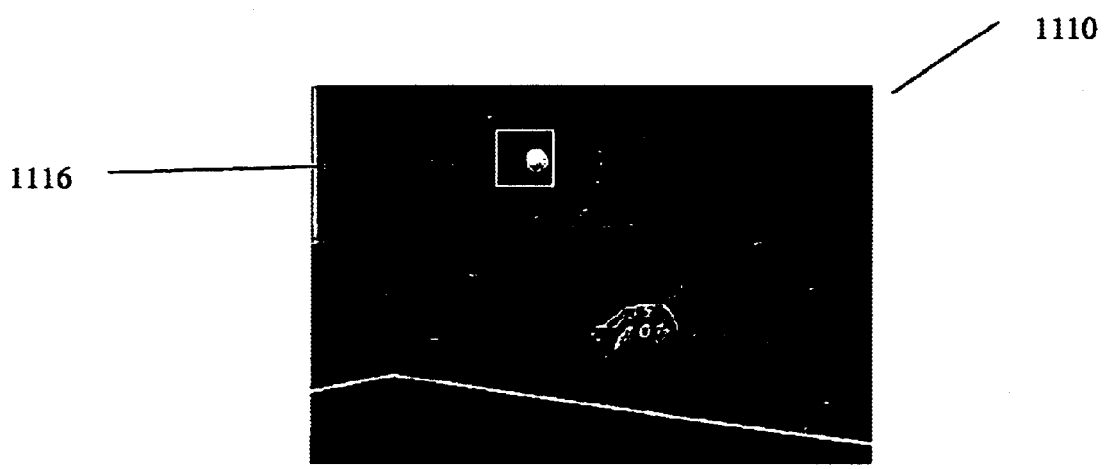
Figure 13A:
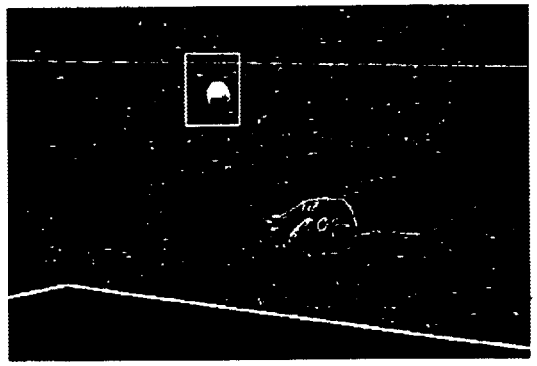
FIGS. 13(A) to 13(F) are illustrations of an object being tracked by the system of FIG. 1 over a sequence of frames.
Figure 13B:
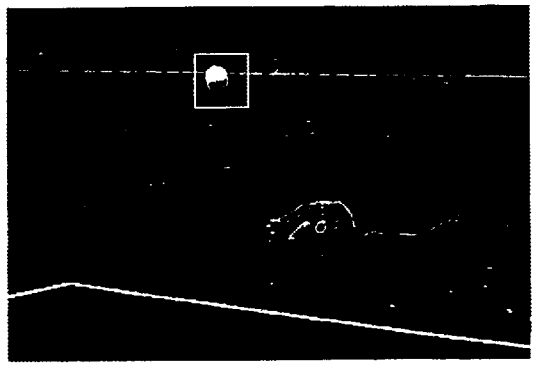
Figure 13C:
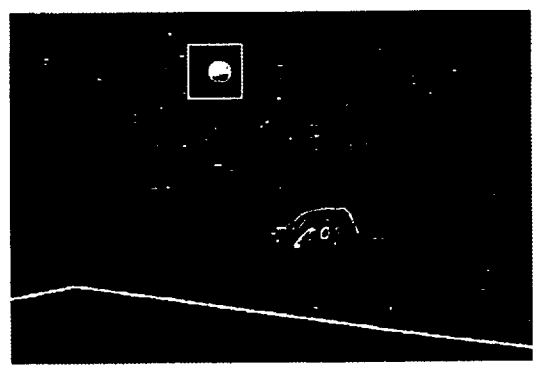
Figure 13D:
Figure 13E:
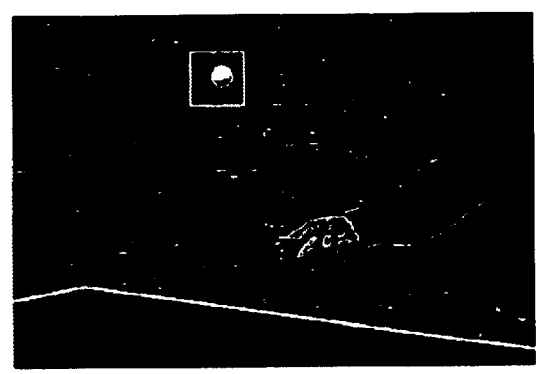
Figure 13F:
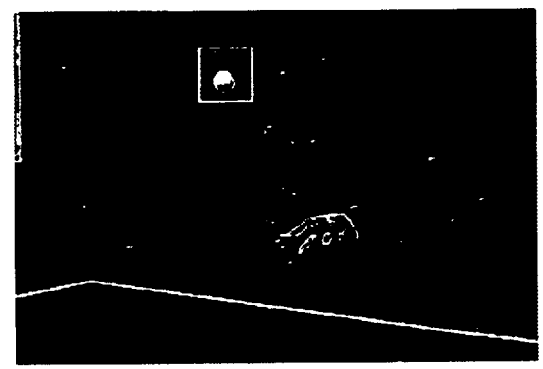

FIGS. 3(A) and 3(B) illustrate a flow chart of a preferred method of operation for the user component 104. At 302, this component 104 receives input on an object to be tracked and preferably receives this input from the user in the form of four parameters. To facilitate the description of these four parameters, FIGS. 12(A) and 12(B) are examples of user input that may be contained in the user-input component 104. A frame 1100 includes a person holding a table-tennis racket object 1102 and a table-tennis ball object 1104. Frame 1100 is the first frame in the video sequence that the user has selected. Frame 1110, shown in FIG. 12(B), includes the same objects as frame 1100 at a different point in time, and it is the last frame in the video sequence that the user has selected. For the purposes of this discussion, the user desires to track the table-tennis ball object 1104 from frame 1100 to frame 1100. In order to identify the object of interest, the user selects a rectangular region 1106 surrounding the ball object 1104 in the frame 1100 and a corresponding rectangular region 1116 in the frame 1110. The four parameters received by the user component 104 are therefore the first frame, last frame, a bounding box for the first frame, and a bounding box for the last frame. In other embodiments of the invention, the user component 104 need not receive the input from the user but may receive it from other sources, such as from storage or from another component that automatically extracts the relevant object and bounding box.

The coordinates of the regions 1106 and 1116 are passed to the user-input component 104, each one as a pair of two-dimensional coordinates $(x_1, y_1)$–$(x_2, Y_2)$. The first coordinate holds the location of the upper-left corner of the region and the second coordinate holds the location of the bottom-right corner of the region. To enable the user to track multiple objects within the same video sequence, these two values of these two inputs are implemented as lists of coordinate pairs. Each single element in each list contains the bounding box location of an object. In addition, in order to identify the frames that the user has selected, two more integer values are passed on to the user-input component 104, which provide the relative position of the frames within the entire video sequence. Similarly to the coordinate pairs, these two inputs are actually lists of integers in case the user has selected multiple objects. The value 0 identifies the first frame of a video sequence and the value n−1 identifies the last frame of a video sequence that contains n frames.

For simplicity reasons, an example will be described of a user selecting a single object to track through the video sequence, such as the table-tennis ball shown in FIGS. 12(A) and 12(B). The extension to the tracking of multiple objects will be apparent to those skilled in the art upon reading this description. The next task at 304 that the user-input component 104 performs is to check whether the coordinates given lie within the dimensions of a specific video sequence. If the coordinates are not valid, as determined at 304, then the execution of the motion engine 100 is terminated at 306 and an error message is returned. Otherwise, the user-input component 104 continues its execution and enters a motion tracking loop at step 308.

At 308, the user component 104 initializes variables, including a loop control variable z which is set to the number of the first frame selected by the user. The expression of the loop, which is the conditional expression that determines whether the loop will be repeated, requires that the loop control variable z be less than the number of the last frame selected by the user. Following each execution of the loop, the loop control variable is incremented by a value of 1 until the last frame is searched. A conditional statement at 312 checks whether the motion estimation component 106 was able to predict the position of the object in the search frame can also interrupt the loop. Before the user component 104 enters the loop, it assigns the number of the first frame k, which is selected by the user, in a variable called CurrentFrame. Within the loop at 314 the frame CurrentFrame+1 is assigned to a variable called NextFrame.

Within this loop at 310, the motion estimation component 106 is called with these two parameters as inputs. The motion estimation component 106 executes a main block-matching algorithm that will be described in more detail below. The motion estimation component 106 returns a value used as a flag to pass the outcome of its execution to the conditional statement. If the motion estimation component 106 returns a value of 1, that means that the object of interest was mapped successfully into the next frame. Then the variable CurrentFrame is first assigned the value of NextFrame, the NextFrame is incremented by one, and the loop is executed again unless the loop control variable z has reached the last frame that the user has selected. The motion estimation component 106 returns a value of 0 when the motion estimation component 106 cannot predict the position of the object in the next frame. This usually happens when the view of the object of interest is occluded by another object or when a high matching error is returned due to the presence of noise in the video signal.

When the motion estimation component 106 fails to track the object at 310 in forward motion, the user component 104 exits the loop and then proceeds to backward motion estimation. The number of the frame where the motion estimation component 106 failed is stored in a variable called LastFrameVisited. A second loop shown in FIG. 3(B), which is similar to the loop in FIG. 3(A), is then executed, beginning at 320. The second loop shown differs in that it uses backward prediction, starting from the last frame the user selected as the current frame and progressing backwards to a previous frame of the video sequence assigned as the search frame. The loop defined at 322, 324, 326, and 328 is executed until the value of the loop variable z reaches the frame number stored in the LastFrameVisited variable.

Thus, the user component 104 progresses the motion estimation component 106 to search in a forward direction from frame to frame and proceeds to a backward direction search only if an error occurs in the forward search. The user component 104 then proceeds to have the motion estimation component 106 search in the backward direction until either an error occurs or the backward search progresses to the point where the forward search terminated.

An exemplary pseudo-code implementation of the forward direction search and backward direction search is represented below:

```
CurrentFrame = First Frame Selected;
For (z = CurrentFrame; z < Last Frame Selected; z++) {
    NextFrame = CurrentFrame + 1;
    Call the motion estimation component 106 for the CurrentFrame and
    the NextFrame;
    If Motion_Estimation(CurrentFrame, NextFrame) = 1 {
```

-continued

```
        CurrentFrame = NextFrame;
        Calculate new bounding box;
    }
    Else {
        LastFrameVisited = CurrentFrame;
        Halt the execution of the loop;
    }
}
CurrentFrame = Last Frame Selected;
For (z = CurrentFrame; z > LastFrameVisited; z--) {
    NextFrame = CurrentFrame - 1;
    Call the motion estimation component 106 for the CurrentFrame and
    the NextFrame;
    If Motion_Estimation(CurrentFrame, NextFrame) = 1 {
        CurrentFrame = NextFrame;
        Calculate new bounding box;
    }
    Else {
        LastFrameVisited = CurrentFrame;
        Halt the execution of the loop;
    }
}
```

If the second loop terminates before the value of the LastFrameVisited is reached, a gap will be created between the last frame visited of the first forward direction search and the last frame visited of the second backward direction search. In order to track the motion of the object of interest within that interval the motion engine 100 is executed again for those frames, with the user having to reselect the bounding boxes that surround the object in the entering and exiting frames.

Figure 4:
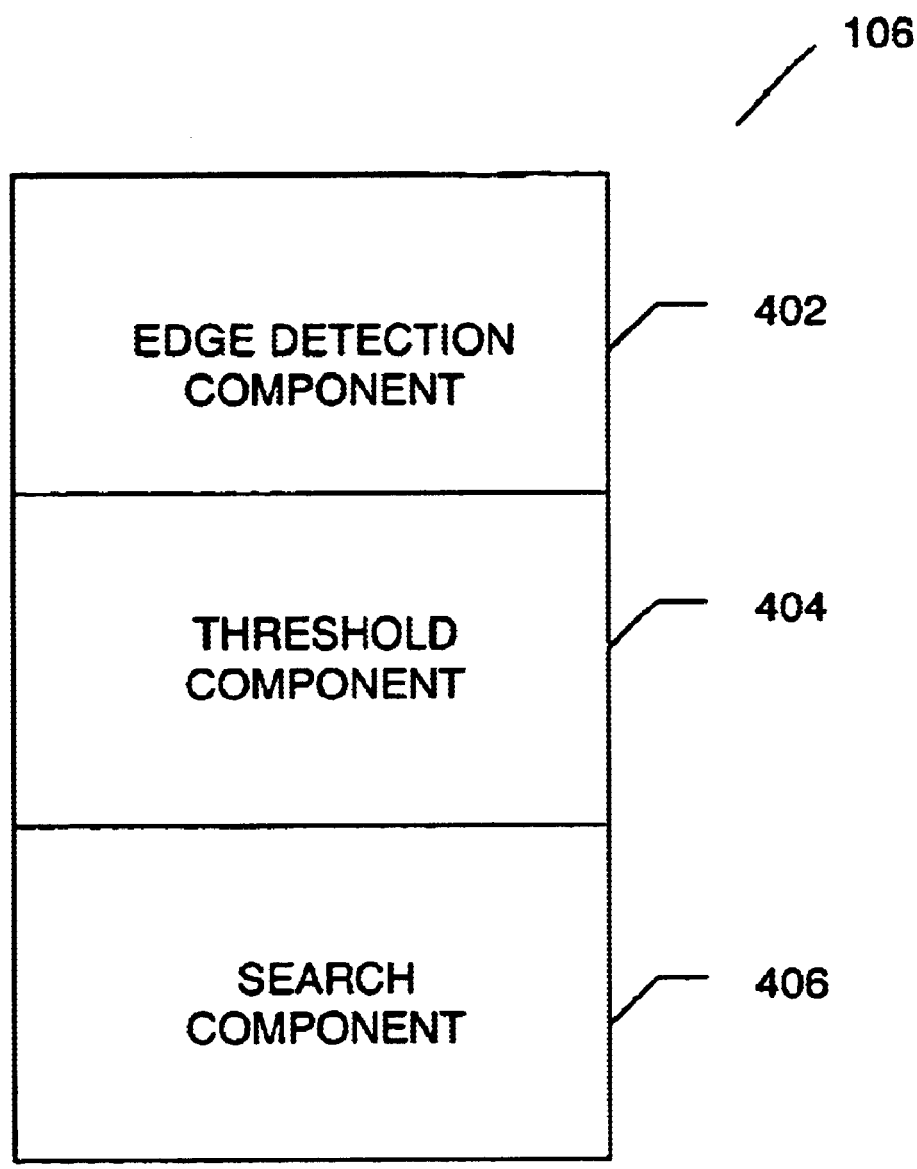
FIG. 4 is a block diagram of a motion estimation component forming part of the system in FIG. 1.

Within the above two mentioned loops, the user component 104 calls the motion estimation component 106. A preferred block diagram of the motion estimation component 106 is shown in FIG. 4. The motion estimation component 106 contains several components, including an edge detection component 402, a threshold component 404, and a search component 406. In general, the edge detection component 402 is used to detect edges within an image, the threshold component 404 is used to determine whether macroblocks within a search window have sufficient edges for a search, and the search component 406 performs a search for an object within the selected macroblocks.

Figure 5A:
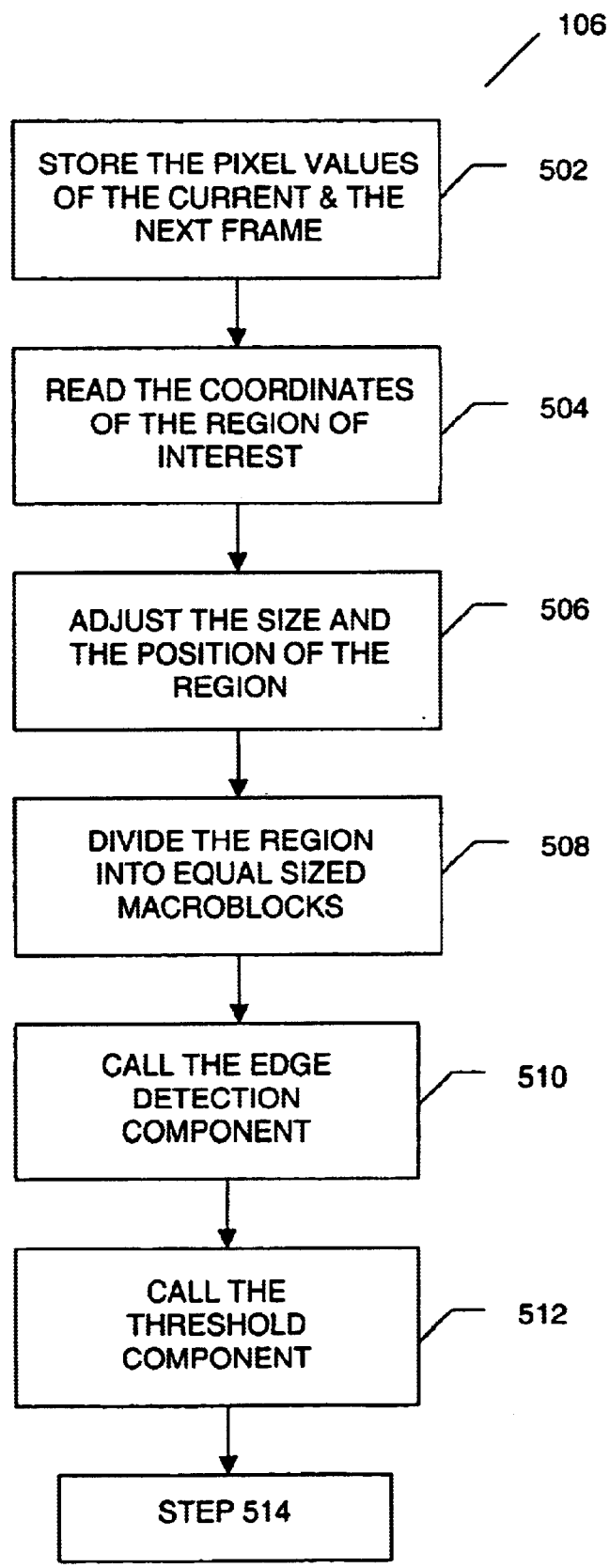
FIGS. 5(A) and 5(B) are flow charts illustrating a method of operation for the motion estimation component of FIG. 4.
Figure 5B:
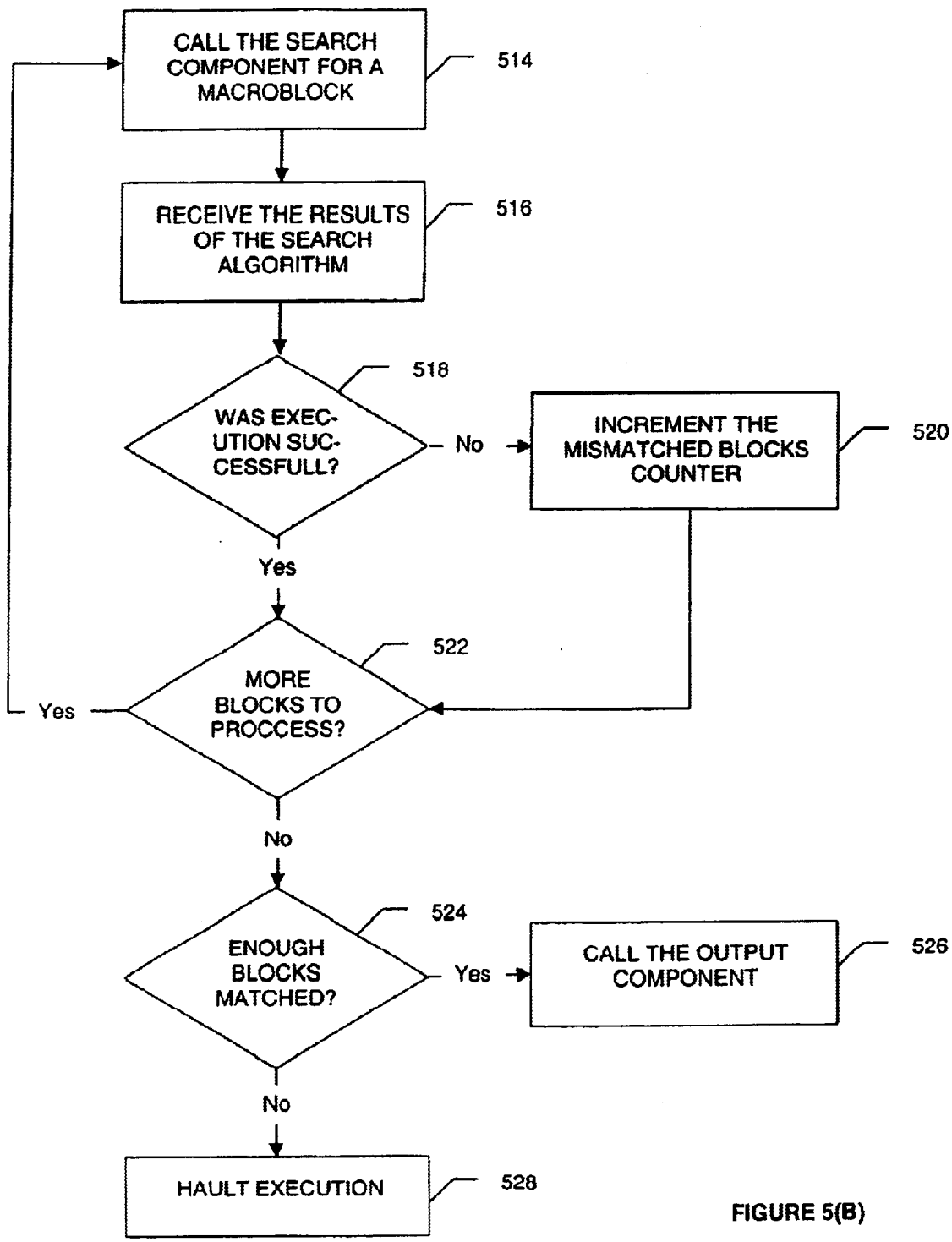

A preferred method of operation for the motion estimation component 106 is shown in FIGS. 5(A) and 5(B). At 502, the motion estimation component 106 obtains the frames referenced by the numbers stored in the CurrentFrame and NextFrame variables. The motion estimation component 106 preferably includes a sub-routine that receives a frame number and returns an array of pixel values of the referenced frame of the active video sequence. Each element of the pixel array is a vector that contains three color values, namely Red, Green and Blue (RGB). By calling this sub-routine the two frames are stored in two arrays, color_current (I, J) and color_next (I, J), where the I variable ranges within the width of the frame (rows) and the J variable ranges within the height of the frame (columns).

Next, at 504, the motion estimation component 106 receives the coordinates of the bounding box that surrounds the object of interest in the current frame, as described above with reference to the user-input component 104. If the motion estimation component 106 is called for the first time, such as during the first execution of the forward direction search, then the two pairs of coordinates are the ones provided by the user in the first frame of the video sequence. Otherwise, they represent the estimated position of the bounding box in the current frame provided by the most recent execution of the motion estimation component 106. The area included within the bounding box, such as bounding box 1106 shown in FIG. 12(A), is divided into smaller blocks called macroblocks whose size is determined by the initialization component 102. In order for the area to be divided into an even number of blocks per each row and per each column, the position of the top-left and bottom-right corners of the bounding box may have to be adjusted at 506 so that the width and the height of the bounding box is a multiple of the macroblock size. The new bounding box is the closest rectangular region that is contained within the original box and can be achieved by the following formulas:

New_TopLeft = Original_TopLeft + (Original_TopLeft mod Block_Size).
New_BottomRight = Original_BottomRight - (Block_Size - Original_BottomRight mod Block_Size).

Each of these formulas has to be calculated twice, once for the x-coordinate and one for the y-coordinate. Both of these new positions lie inside the original bounding box, causing the bounding box to reduce slightly in size.

Figure 6:
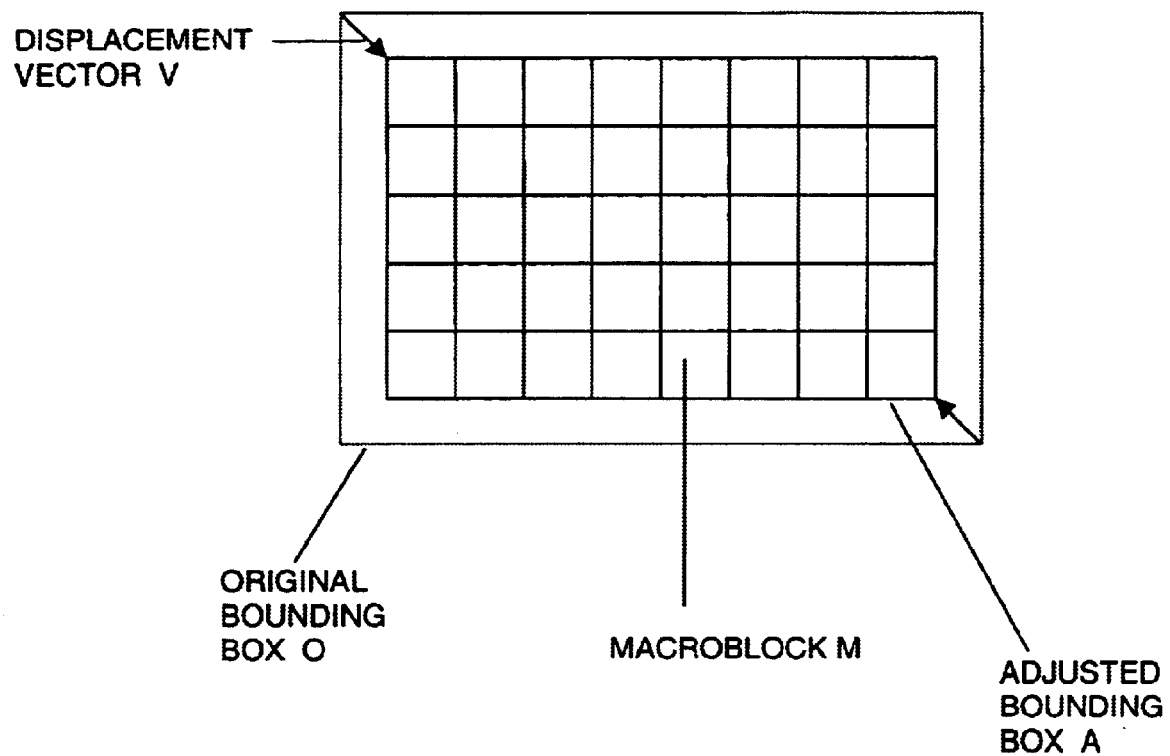
FIG. 6 is a diagram illustrating a size adjustment for a bounding box.

FIG. 6 is an illustration of an original bounding box O that has been reduced in size to an adjusted bounding box A. As can be seen in FIG. 6, the adjusted bounding box A has a width and a length that hold an integer multiple of the macroblock M. A displacement vector V represents the reduction in size from the original bounding box O to the adjusted bounding box A. The actual magnitude of the displacement vector depends on the original position of the bounding box O. The value of each of their coordinates can range between 0 and (Block_Size-1) in pixel units.

While the original bounding box O may be expanded to accommodate an integer multiple of macroblocks M, the original bounding box O is preferably reduced in size. A primary reason for reducing, instead of expanding the original bounding box O is to overcome a potential problem that may arise if the bounding box was adjusted outwards. If there is a moving object $O_2$ in the vicinity of a selected object $O_1$ and the bounding box is expanded, the expanded bounding box may include a small part of the adjacent object $O_2$. By including both the selected object $O_1$ and the adjacent object $O_2$ in the bounding box, the motion estimation component 106 could track both objects at the same time, treating them as one. This error may propagate from frame to frame, as the selected region could keep increasing in order to include both objects $O_1$ and $O_2$, causing the adjusted bounding box to keep expanding. Clearly in this case, the motion estimation component 106 will produce undesired results, since the tracked area will include not only the object of interest, but also one or potentially more objects that the user did not select in the first frame. In contrast, by adjusting the bounding box inwards, the selected region is "forced" to stay closer to the boundaries of the selected object and thus avoiding this potential problem.

After the region is divided into blocks in step 508, the edge detection component 402 is called at 510 for the new adjusted area of the current frame. The edge detection component 402 will be described in more detail below with reference to FIG. 7. In general, as discussed above, the edge detection component 402 receives the array color_current (I, J) and the coordinates of the adjusted bounding box and returns the gradient of the specified array. This gradient of the array represents a measure of edges within the bounding box. Next, at 512, the threshold component 404 uses the gradient to determine which ones of the macroblocks have sufficiently strong edges for purposes of the search component 514.

The search component 406 next preferably executes a search algorithm in the selected macroblocks at 514, 516, 518, 520, and 522. This search algorithm involves performing a search at 514 for a first macroblock, returning the results of the search at 516, determining whether the search is successful at 518, incrementing a count if the search was successful at 520, and then moving to the next macroblock at 522 if more macroblocks are available. At 524, after all eligible macroblocks have been searched, the motion estimation component 106 checks whether enough blocks were matched. This check is performed by comparing the number of matched macroblocks counted at 520 with the threshold $T_3$. The output component 108 is called at 526 if enough macroblocks were matched, otherwise execution of the motion estimation component 106 is halted at 528.

Figure 7:
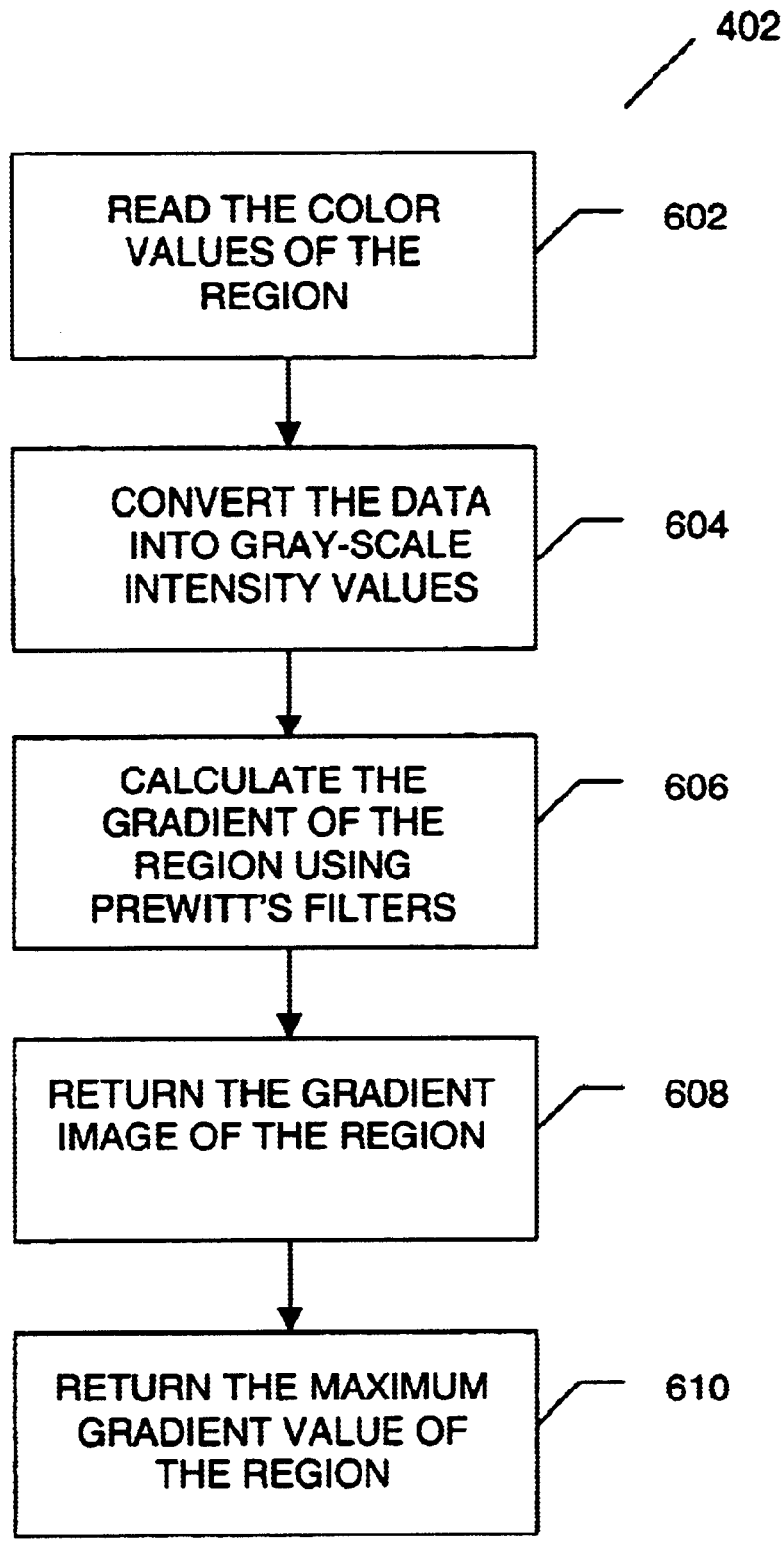
FIG. 7 is a flow chart illustrating a method of operation for an edge detection component forming part of the motion estimation component of FIG. 4.
Figure 9:
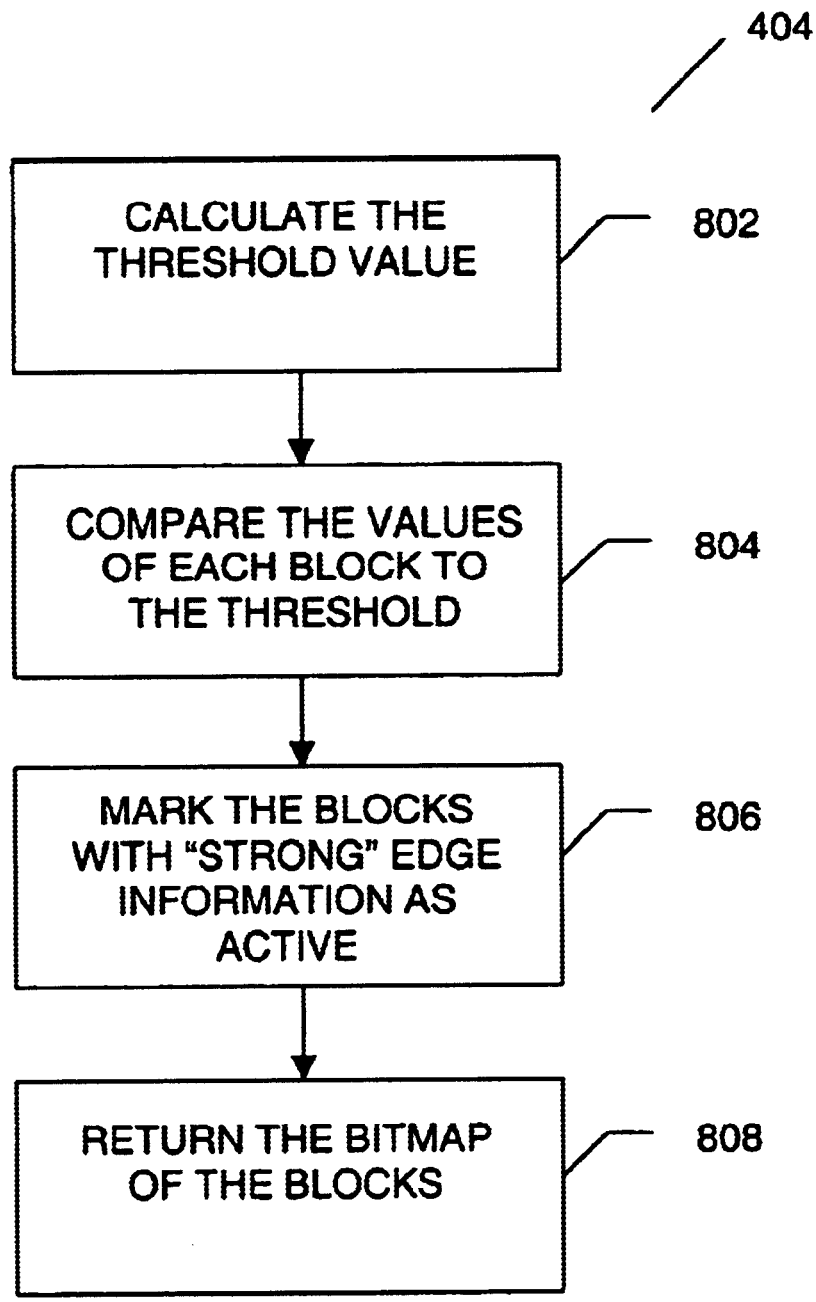
FIG. 9 is a flow chart illustrating a method of operation performed by a threshold component forming part of the motion estimation component of FIG. 4.

A preferred method of operation for the edge detection component 402 is shown in FIG. 7. First at 602, the edge detection component 402 reads the contents of the color_current (I, J) array within the area specified by the bounding box and at 604 creates a new array with the gray intensity values of the region. For computational speed, the intensity value of each pixel is preferably calculated at 604 as the arithmetic average of its RGB values. The conversion of the image at location x=(x, y) is given by the following formula:

gray_current(x) = the floor function of (color_current(x, Red) + color_current(x, Green) + color_current(x, Blue)/3.0) + 0.5.
If gray_current(x) > 255, then gray_current(x) = 255.

The size of the new array gray_current (I, J) is equal to the size of the bounding box. Then, at 606, the gradient value of the image at each pixel location is calculated by convoluting the gray image with Prewitt's gradient filters. Prewitt's gradient filters are used to compute two gradients at each pixel location, one in the x direction and one in the y direction using the two filters shown in FIGS. 8(A) and 8(B). The final gradient value at a particular location is given by the arithmetic average of the absolute values of the two directional gradients. Next, at 608, the edge detection component 402 stores the gradient values of the region in a new array called gradient_array (I, J) and returns the array to the motion estimation component 106 for further processing. The edge detection component 402 at 610 also returns the maximum gradient value of the gradient_array (I, J), which will be used by the threshold component 404.

As discussed above, after the edge detection component 402 returns the results of the edge detection, the motion estimation component 106 calls the threshold component 404 at 512 with the gradient_array (I, J) and the maximum gradient value as parameters. A purpose of the threshold component is to determine which blocks within the region enclosed by the bounding box contain sufficient edge information, preferably strong edges, for tracking purposes. The macroblocks with weak edge information, such as macroblocks that belong either to the background or blocks that contain similar gray-level patterns, can be eliminated from the search algorithm, thereby reducing the potential of a false match. The threshold component 404 therefore, looks for high gradient values that translate to abrupt changes in the color values between neighboring pixels. The pixels having high gradient values are usually at the boundaries or edge of the object to be tracked.

With reference to FIG. 7, the threshold component 404 at 802 first establishes a threshold that will be used as a cut-off point for the macroblocks. This new threshold value $T_4$ is preferably calculated by multiplying the maximum gradient value received from the edge detection component 402 with the threshold $T_1$, whose value was set by the initialization component 102. A typical value for the threshold $T_1$ is between 50% and 75%. The higher the value of the threshold $T_4$, the more "strict" the cut-off criterion will be, thereby resulting in a fewer number of marked macroblocks. On the other hand if this threshold value is set too high, there is a potential of discarding too many macroblocks, in which case the motion estimation component 106 may return with no new results.

After setting the value of threshold $T_4$, the threshold component 404 at 804 compares the contents of each macroblock to the value of $T_4$. Each macroblock holds a number of gradient values equal to the product of the Block_Size×Block_Size. If any of these values is over the value of the threshold $T_4$ then the current macroblock is declared to have at least one strong edge, and is declared as active. On the other hand, if none of the values contained within the macroblock is higher than the value of the threshold $T_4$, then the macroblock is declared as inactive and is not included in any further computations by the search component 406. The threshold component 404 creates a new binary map at 806, with each element in this binary map corresponding to a macroblock within the bounding box. If a macroblock is declared as active, then the corresponding location of the binary map is assigned a value of 1, otherwise it is assigned a value of 0. After processing all the macroblocks, the threshold component 404 at 808 returns the binary map to the motion estimation component 106 for use by the search component 406.

The search component 406 performs the main search algorithm of the motion estimation component 106. As explained above, the search component 406 encompasses the main principles of the full search, three-step search and hierarchical algorithms to create a new robust search engine 100. A preferred method of operation for the search component 406 will now be explained with reference to FIGS. 10(A) and 10(B). The search algorithm shown in FIGS. 10(A) and 10(B) is a two-part algorithm with the first part being a three-step search and the second part a full search but having characteristics of a hierarchical search.

Figure 10A:
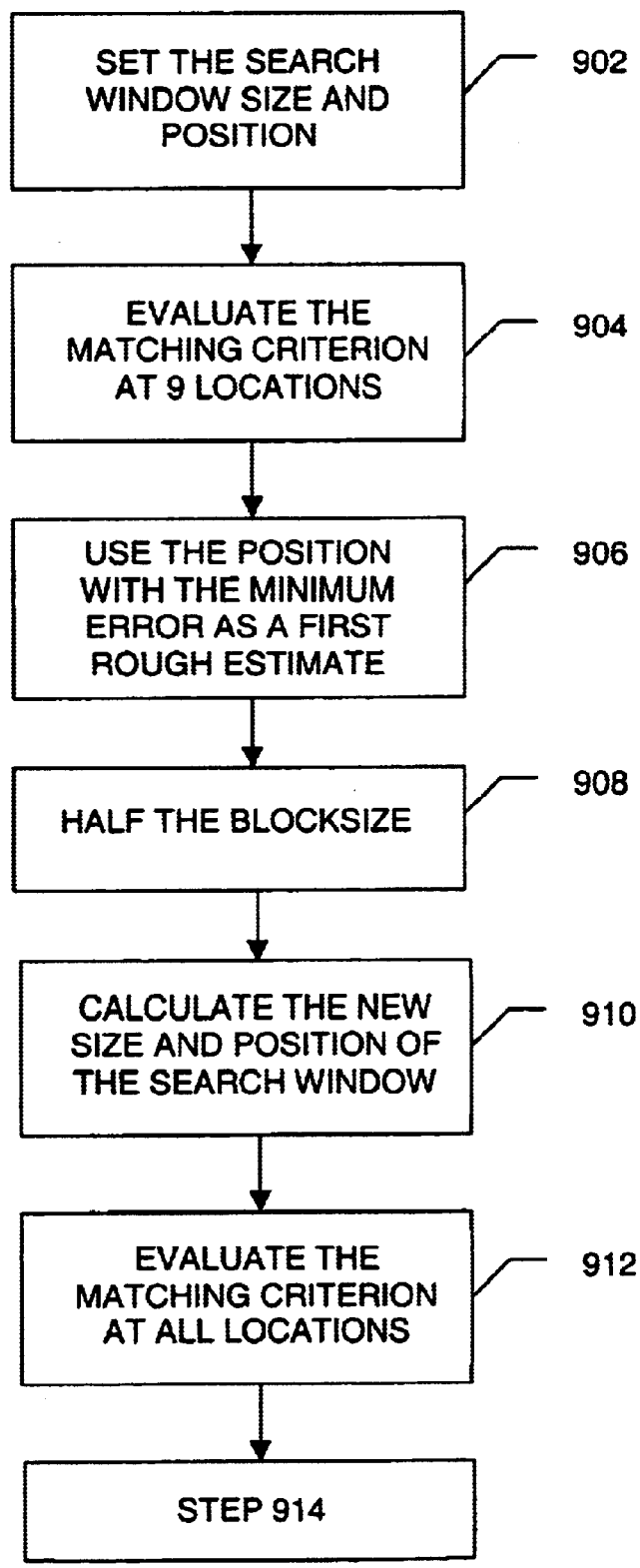
FIGS. 10(A) and 10(B) are flowcharts illustrating a method performed by the search algorithm forming part of the motion estimation component of FIG. 4.
Figure 10B:
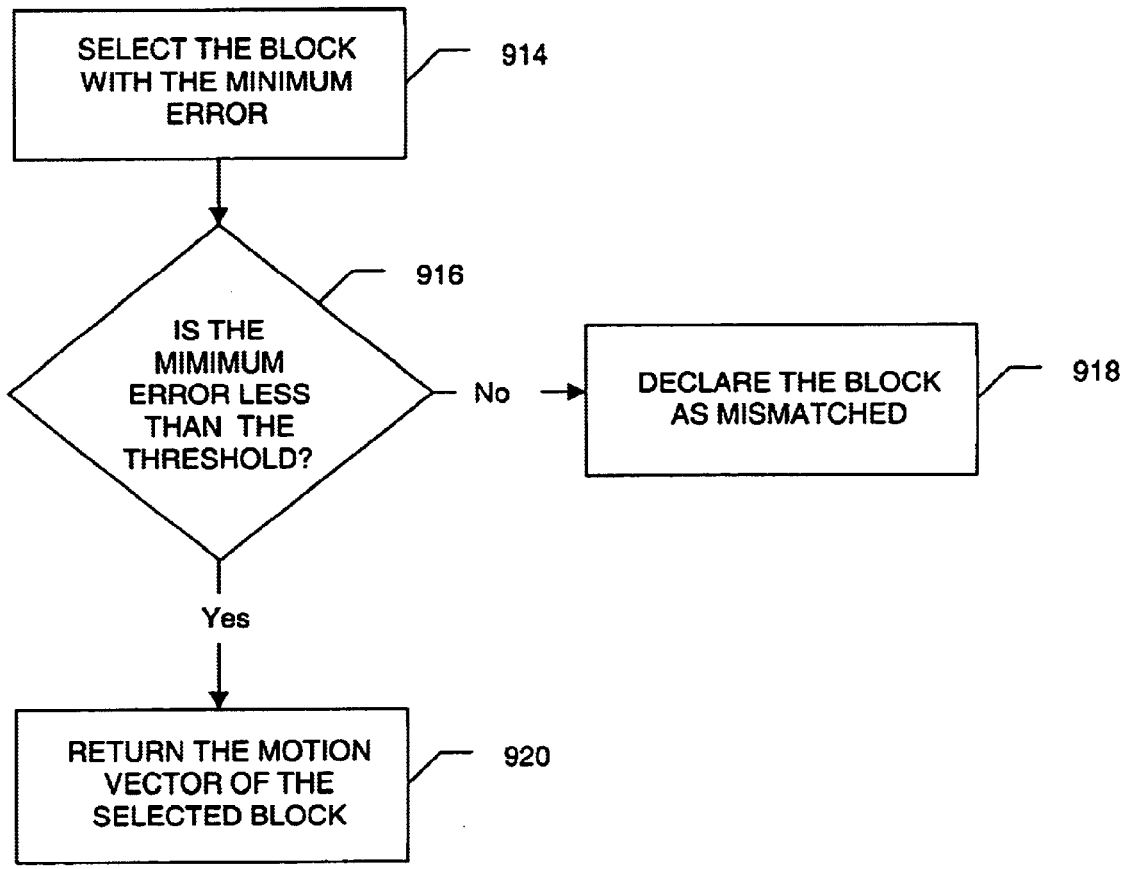

With reference to FIG. 10(A), the search component 406 examines nine (9) locations within the search window to find the best matching macroblock. The search component 406 sets the size of the search window at 902 to be equal to the size of the current search macroblock plus a displacement vector. The length of the vector is proportional to the size of the macroblock and is calculated by the following formula:

Displacement_Vector=Block_Size/2−1.

So for example if the top-left corner of the current macroblock is at location x=(x, y) then the size and location of the search macroblock will be:

Top-left = (x − Displacement_Vector, y − Displacement_Vector).
Bottom-right = (x + Block_Size + Displacement_Vector, y + Block_Size + Displacement_Vector).

The search component 406 sets these initial values at 902. The current macroblock is located in the current frame, whereas the search window is placed in the next frame.

Next at 904, nine evenly distributed locations within the window are searched for the best matching macroblock. The search component 406 preferably finds the best matching macroblock based on mean absolute difference criterion. At each of the nine locations, a macroblock of equal size to the current macroblock is placed and a pixel-to-pixel comparison is calculated in order to evaluate the error between the two macroblocks. The error between two pixels is computed for each of the three color values and then added together to yield the final total error. At the beginning of the error computation the variables Error_Red, Error_Green, Error_Blue and Total_Error, are all set to 0. If the position of the top-left corner of the macroblock is given by the variable current_position and the position of the top-left corner of the search block is given by the variable next_position, then the mean absolute difference can be calculated by the following double loop:

```
For (I = 0; I ≦ Block_Size; I++) {
    For (J = 0; J ≦ Block_Size J++) {
        Error_Red += abs(color_current(current_position.x + I,
            current_position.y + J, Red) – color_next(next_position.x + I,
            next_position.y + J, Red));
        Error_Green += abs(color_current(current_position.x + I,
            current_position.y + J, Green) – color_next(next_
            position.x + I, next_position.y + J, Green));
        Error_Blue += abs(color_current(current_position.x + I,
            current_position.y + J, Blue) – color_next(next_position.x + I,
            next_position.y + J, Blue));
        Total_Error = (Error_Red + Error_Green + Error_Blue)/3;
    }
}
Total_Error = Total_Error/(Block_Size x Block_Size);
```

After calculating the Total_Error for each of the nine locations, the search component 406 selects the location with the minimum error as the best match at 906. If more than one of the locations have the same minimum error, then the search component 406 selects the one closest to the position of the macroblock.

In this first part of the search algorithm, the search component 406 narrows down the search area. In the second part of the search algorithm, the search component 406 at 906 uses the resulting location as an initial rough estimate or starting point of the position of the best matching macroblock. The second part of the algorithm employs a full search algorithm because it yields the best results. Borrowing on the concept of variable block sizes from the hierarchical search algorithm, the search component 406 divides the size of the blocks in half at 908. Reducing the size of the macroblocks does not hurt the performance of the algorithm since the initial estimated position is calculated using the regular macroblock size. A smaller block size also results in a smaller search window since the search window is proportional to the area of the block. The combination of a smaller search window and a smaller block size therefore results in a significantly faster execution time of the second part of the search over a conventional full search algorithm. Thus, the motion engine 100 achieves the performance of the full search algorithm without the computational overload normally associated with a full search. A reason for using a full search algorithm in the second part, instead of continuing with the last two steps of a conventional three-step search, is to avoid the problem of getting trapped in a local minimum and not find the optimal solution, which is a common shortcoming of this algorithm.

As with the first part of the search algorithm, the search component 406 uses the mean absolute error (MAE) criterion to select the best matching macroblock. After calculating the new size and position of the search window at 910, the search component 406 examines all of the possible locations at 912 within the search window to find the macroblock that yields the minimum error. The number of blocks searched by the search component 406 depends on the size of the blocks and of the search window. After the completion of the search, the search component 406 selects the block that yields the smallest error at 914. At 916, the search component 406 compares the lowest matching error against the predefined threshold $T_2$. If the error is smaller than this threshold $T_2$, the search component 406 returns the motion vector that corresponds to that macroblock. The motion vector is the signed difference between the position of the current macroblock and the position of the matched macroblock. Otherwise at 918, the search component 406 returns a flag that indicates that the current macroblock was not tracked successfully.

While the preferred method of operation for the search component 406 is shown in FIGS. 10(A) and 10(B), it should be understood that the search component 406 may implement additional or alternatively methodology. For instance, in order to lower the computational complexity and increase the execution speed of the search component 406, the search component 406 may rely upon some estimated guesses to help avoid unnecessary calls of the search algorithm shown in FIGS. 10(A) and 10(B).

Figure 11:
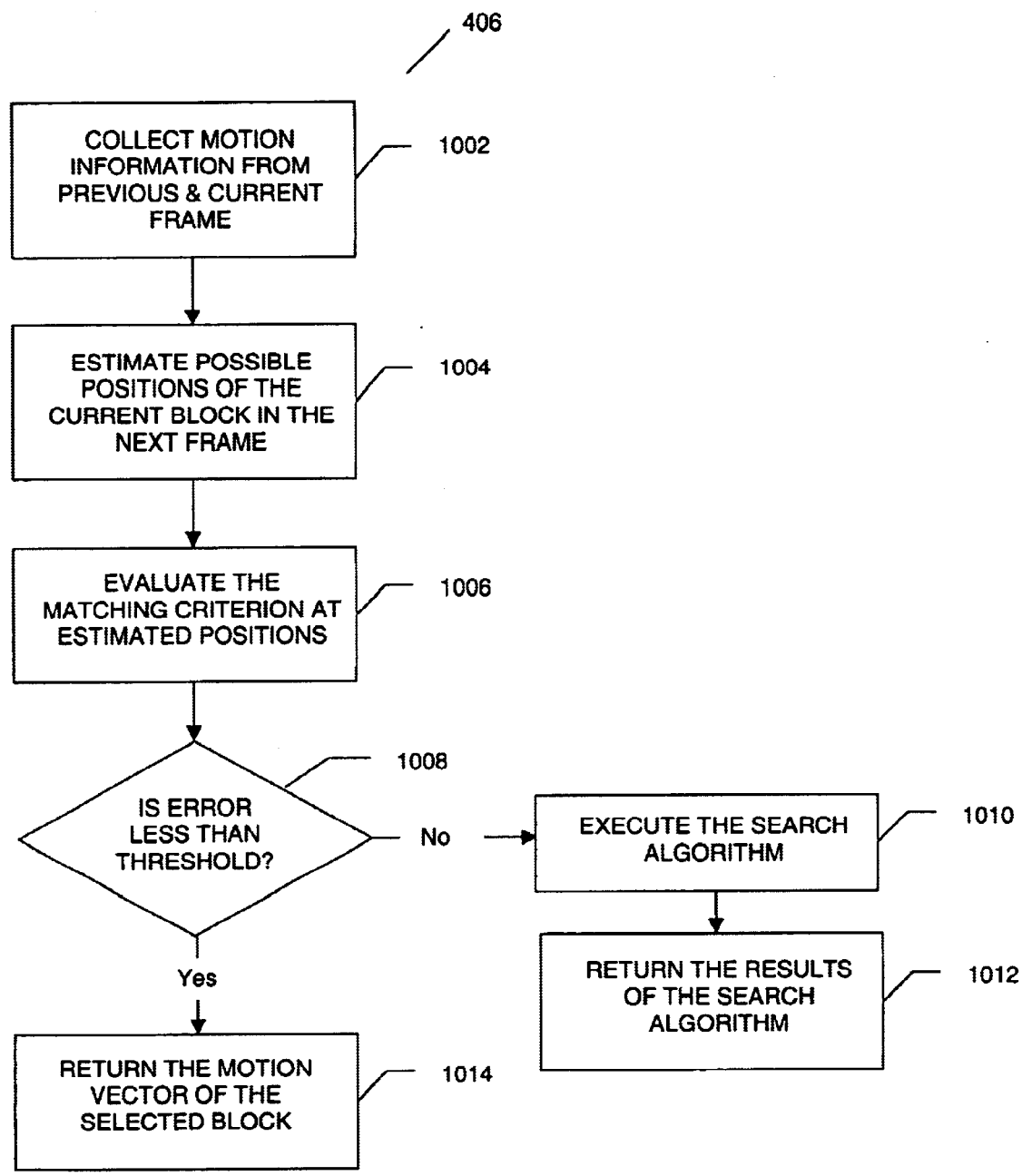
FIG. 11 is a flow chart illustrating a method performed by the search component.

One example of such a reliance on estimated guesses is shown in FIG. 11. With reference to FIG. 11, the search component 406 at 1002 collects motion information from the previous frame and the current frame and at 1004 makes an estimated "guess" of the position of the current macroblock. If the MAE between the current macroblock and the predicted search macroblock is below the threshold $T_2$, then the predicted block is declared as a match. The search component 406 then returns its motion vector without having to call the search algorithm shown in FIGS. 10(A) and 10(B). The position of the predicted macroblock in the search frame can be calculated through several ways. By making the basic assumption that an object follows a smooth motion trajectory, especially over a short period of time, previous motion information about the current block can be used as a good estimation.

For each of the blocks that were declared as "active" by the threshold component 404, the search component 406 receives the position of each block, given by the top-left position of the block and the block size. The search component 406 also receives at 1002 the motion vector that moved the block to its current location from the previous frame (if applicable) and the rest of the motion vectors that have already been calculated for any of its neighbors in the current frame. On a rectangular grid, a macroblock can have up to eight immediate neighbors. In the next two steps, the search component 406 first uses the motion information from the previous frame to predict the position of the search macroblock. If the error between the two macroblocks is below the predefined threshold $T_2$, as determined at 1008, it returns the same motion vector at 1014. If not, the search component 406 executes the search algorithm at 1010 by examining the available motion estimation of its neighbor macroblocks in the current frame. If the current block and its neighbors belong to the same object, then it is likely that they have the similar motion. An arithmetic average of the motion vectors of the neighbors is calculated and then applied to the current block to get the position of the estimated block in the next frame. The MAE between the two blocks is evaluated and if it is below the threshold $T_2$, the predicted block is declared as a match, and the algorithm returns the calculated motion vector.

If the MAE is over the threshold $T_2$, then the previously described search algorithm is performed in step 1010. The search window is scanned for the best matching block at 1010 and the search component 406 returns the results of the search algorithm at 1012.

As explained above, the results of the motion estimation component 106 is used in counting the number of matched macroblocks. After the search component has been called for all the macroblocks in the eligible list of macroblocks, the user component 104 checks the value of the mismatched counter at 524. If the value is over the predefined threshold $T_3$, then the entire frame is declared as mismatched and the execution of the motion engine 100 is halted at 528. If execution is halted during the forward direction search, the motion engine 100 resumes from the last frame that the user has selected and repeats the motion estimation process using backward prediction. If the number of blocks matched in the current frame is satisfactory, in other words the value of the mismatched counter is below the threshold $T_3$, then the output component 108 is called at 526.

The output component 108 collects all the motion vectors calculated for the current frame and applies it to the object of interest and its bounding box. The minimums and the maximums in the x and y directions of the macroblocks comprising the current bounding box are calculated and are used to provide the top-left and bottom-right corners for the new position and size of the bounding box in the next frame. The motion engine 100 continues its execution as described with reference to FIGS. 3(A) and 3(B) until all of the frames have been visited.

An example of an execution of the motion engine 100 is illustrated in FIGS. 13(A) to 13(F). First, as shown in FIGS. 12(A) and 12(B), the user selects the first and last frames and also inputs bounding boxes. The motion engine 100 then proceeds to track the object, which in this example is a table-tennis ball 1104, from the first frame to the last frame. FIGS. 13(A) to 13(F) illustrate the tracking of the table-tennis ball 1104 from the very first frame 1100 shown in FIG. 13(A) to the last frame 1110 shown in FIG. 13(F).

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, in the preferred embodiment, frames of a video sequence are divided in blocks, such as macroblocks. It should be understood that the frames may be divided into any suitable types of sub-areas and is not limited to just blocks. For instance, instead of rectangular or square sub-areas within a frame, the invention may employ sub-areas having other shapes, such as triangles, circles, ovals, or may employ sub-areas that have contours that are based on the shape of an object whose motion is being tracked.

The motion tracking systems and methods according to the invention are useful in many applications. For instance, the invention may be used in indexing and accessing images or in compression of images.

Furthermore, the invention may be used in object segmentation. A user may be interested in extracting a particular object from a video sequence in order to generate a new sequence with only the object of interest present. Motion estimation can be used to identify the position and the frames that the object is present. A segmentation algorithm can be used then to segment the contents of the bounding boxes that surround the object.

As another example, in the context of the new MPEG-4 compression standard, MPEG is a family of algorithms for compressing and transmitting digital videos. MPEG-1 is widely used on the Internet and MPEG-2 is used in DVD's and HDTV. MPEG-4 is the next generation of these standards, where each video is broken down to video planes, each one consisting of an object, and encoded and separately transmitted. Motion estimation can be used to track the objects in the video, so they can be segmented, compressed and transmitted over the web.

Also, the invention can be used in other applications that will become apparent to those skilled in the art. The invention may be used in military target tracking, such as for tracking the position of a plane or missile. The invention may be used in remote video surveillance for security purposes in a store or a bank. The invention could also be used in medical applications, such as cineangiography or cardiac catheterization.

The embodiments were chosen and described in order to explain the principles of the invention and their practical application so as to enable others skilled in the art to utilize the invention and various embodiments and with various modifications as are suited to the particular use contemplated.

What is claimed is:

1. A process for tracking motion of an object image in a sequence of video frames, comprising:
   a. Inputting information into computer processing capacity identifying a first frame and a second frame of the sequence of video frames;
   b. Inputting information identifying a first bounded area within the first frame and a second bounded area within the second frame, the bounded areas each containing an image of the object;
   c. Defining a plurality of sub areas in the first bounded area and for each sub area:
      1. Inputting values for plurality of pixels in the sub area; and
      2. Calculating a gradient corresponding to an array of pixel values
   d. Using said first bounded sub area gradients to select sub areas which meet a predetermined first threshold as representative of sufficient object edge information;
   e. Defining a plurality of sub areas in the second bounded area and for each second bounded area sub area:
      1. Inputting values for plurality of pixels in the sub area; and
      2. Calculating a gradient corresponding to an array of pixel values;
   f. Using said second bounded area sub area gradients to select sub areas which meet a predetermined first threshold as representative of sufficient object edge information; and
   g. Applying a search algorithm to said selected sub areas to determine a plurality of motion vectors that represent motion of the object image from first frame to second frame, including:
      1. Identifying a candidate sub area of the first frame;
      2. Choosing one of the mapped second bounded area sub areas in the second frame as a first search phase sub area;
      3. Selecting a plurality of sub areas in the vicinity of the first phase search sub area as additional first phase search sub areas and comparing a plurality of pixels in at least some of the first phase search sub areas to a plurality of pixels in the candidate sub area of the first frame to select a first phase search sub area in the second frame that best matches the candidate sub area of the first frame;

4. Selecting a second phase search window and a set of second phase search sub areas based on the first phase search sub area in the second frame that best matches the candidate sub area of the first frame, the second phase search sub areas smaller than the first phase sub areas;

5. Comparing a plurality of pixels in at least some of the second phase search sub areas to a plurality of pixels in the candidate sub area of the first frame to select a second phase search sub area in the second frame that best matches the candidate sub area of the first frame;

6. Determining a motion vector based on the position of the second phase search sub area in the second frame that best matches the candidate sub area of the first frame, and the position of the candidate sub area of the first frame; and 7. Repeating items 1 through 6 above for a plurality of sub areas in order to determine a plurality of motion vectors which represent motion of the object image between the first frame and the second frame.

2. A process according to claim 1 wherein, in items (c) and (e), if the area of first bounded area is not a multiple of the areas of the sub areas, then reducing the size of the first bounded area until it is a multiple of the areas of the subareas.

3. A process according to claim 1 wherein calculating a gradient in items (c) and (e) comprises using a Prewitt filter.

4. A process according to claim 1 wherein, in item (g)(3), comparing a plurality of pixels in at least some of the first phase search sub areas to a plurality of pixels in the candidate sub area of the first frame comprises using a mean absolute difference criterion.

5. A process according to claim 1 wherein, in item (g)(5), comparing a plurality of pixels in at least some of the second phase search sub areas to a plurality of pixels in the candidate sub area of the first frame comprises using a mean absolute difference criterion.

6. A process according to claim 1 wherein determining a motion vector in accordance with item (g)(6) comprises predicting the position of a second phase search sub area in the second frame based on at least one motion vector from a previous frame.

7. A process according to claim 1 wherein the video frames are MPEG video frames.

8. A process according to claim 1 further comprising categorizing the frames based on information corresponding to the motion vectors.

9. A process according to claim 1 further comprises storing the frames in a database using information corresponding to the motion vectors as search identification information.

* * * * *